(12) United States Patent
Fischer

(10) Patent No.: US 8,556,290 B2
(45) Date of Patent: Oct. 15, 2013

(54) VEHICLE OCCUPANT RESTRAINT SYSTEM FOR A VEHICLE SEALING ELEMENT

(75) Inventor: Anton Fischer, Schechingen-Leinweiler (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 13/280,419

(22) Filed: Oct. 25, 2011

(65) Prior Publication Data

US 2012/0274053 A1 Nov. 1, 2012

(30) Foreign Application Priority Data

Nov. 30, 2010 (DE) .......................... 10 2010 052 782

(51) Int. Cl.
*B60R 21/217* (2011.01)
(52) U.S. Cl.
USPC ........................................ 280/728.2; 280/741
(58) Field of Classification Search
USPC .............................................. 280/741, 728.2
See application file for complete search history.

(56) References Cited

U.S. PATENT DOCUMENTS

| | | | | |
|---|---|---|---|---|
| 2,623,974 | A * | 12/1952 | Prucha | 219/93 |
| 5,468,012 | A * | 11/1995 | Mihm | 280/728.2 |
| 5,472,229 | A * | 12/1995 | Bishop et al. | 280/728.2 |
| 5,845,928 | A * | 12/1998 | Nelsen et al. | 280/728.2 |
| 6,224,089 | B1 * | 5/2001 | Uchiyama et al. | 280/728.2 |
| 6,439,604 | B1 * | 8/2002 | Al-Amin et al. | 280/736 |
| 6,524,013 | B2 * | 2/2003 | Beghini et al. | 384/602 |
| 6,814,369 | B2 * | 11/2004 | Heindl | 280/728.2 |
| 7,631,888 | B2 * | 12/2009 | Seidl et al. | 280/728.2 |
| 7,780,188 | B2 * | 8/2010 | Eckert et al. | 280/728.2 |
| 7,806,429 | B2 * | 10/2010 | Fangmann et al. | 280/728.2 |
| 8,007,000 | B2 * | 8/2011 | Gammill et al. | 280/730.2 |
| 8,196,952 | B2 * | 6/2012 | Walston et al. | 280/728.2 |
| 8,215,664 | B2 * | 7/2012 | Arima et al. | 280/728.2 |
| 8,286,993 | B1 * | 10/2012 | Arima et al. | 280/728.2 |
| 8,297,650 | B2 * | 10/2012 | Enders | 280/730.1 |
| 2002/0008373 | A1 * | 1/2002 | Specht | 280/741 |
| 2003/0038459 | A1 * | 2/2003 | Leibach et al. | 280/728.2 |
| 2004/0150202 | A1 * | 8/2004 | Goto | 280/740 |
| 2005/0104336 | A1 * | 5/2005 | Schneider et al. | 280/728.2 |
| 2005/0134022 | A1 * | 6/2005 | Noguchi et al. | 280/728.2 |
| 2005/0225058 | A1 * | 10/2005 | Braun | 280/728.2 |
| 2006/0108778 | A1 * | 5/2006 | Ochiai et al. | 280/730.2 |
| 2008/0073883 | A1 * | 3/2008 | Fischer et al. | 280/728.2 |
| 2008/0084051 | A1 * | 4/2008 | Okuhara et al. | 280/728.2 |
| 2010/0078919 | A1 * | 4/2010 | Naruse et al. | 280/728.2 |

(Continued)

OTHER PUBLICATIONS www.freedictionary.com/flange—flange definition.*

*Primary Examiner* — Paul N Dickson
*Assistant Examiner* — Nicole Verley
(74) *Attorney, Agent, or Firm* — Tarolli, Sundheim, Covell & Tummino LLP

(57) ABSTRACT

The invention relates to a vehicle occupant restraint system (10) for a vehicle comprising an inflator (14) and an airbag (12) connected to the inflator (14). The inflator (14) includes a mounting extension (42) which is provided for mounting the inflator (14) on a vehicle part (18) and projects through an orifice in the airbag (12). A sealing assembly (58) arranged at the mounting extension (42) is provided which clamps the airbag (12) against the inflator (14) and seals the orifice in the airbag (12). Furthermore, the invention relates to a sealing element (60) having a closed annular sealing body (68) including at least one lateral extension (64, 66) which extends in the central plane (E) of the sealing body (68).

17 Claims, 3 Drawing Sheets

(56) References Cited

U.S. PATENT DOCUMENTS

| | | | |
|---|---|---|---|
| 2011/0025023 A1* | 2/2011 | Hatfield et al. | 280/728.2 |
| 2011/0148077 A1* | 6/2011 | Enders | 280/728.2 |
| 2011/0163521 A1* | 7/2011 | Gammill et al. | 280/728.2 |
| 2012/0025496 A1* | 2/2012 | Schneider et al. | 280/728.2 |
| 2012/0098239 A1* | 4/2012 | Weigand | 280/728.2 |

* cited by examiner

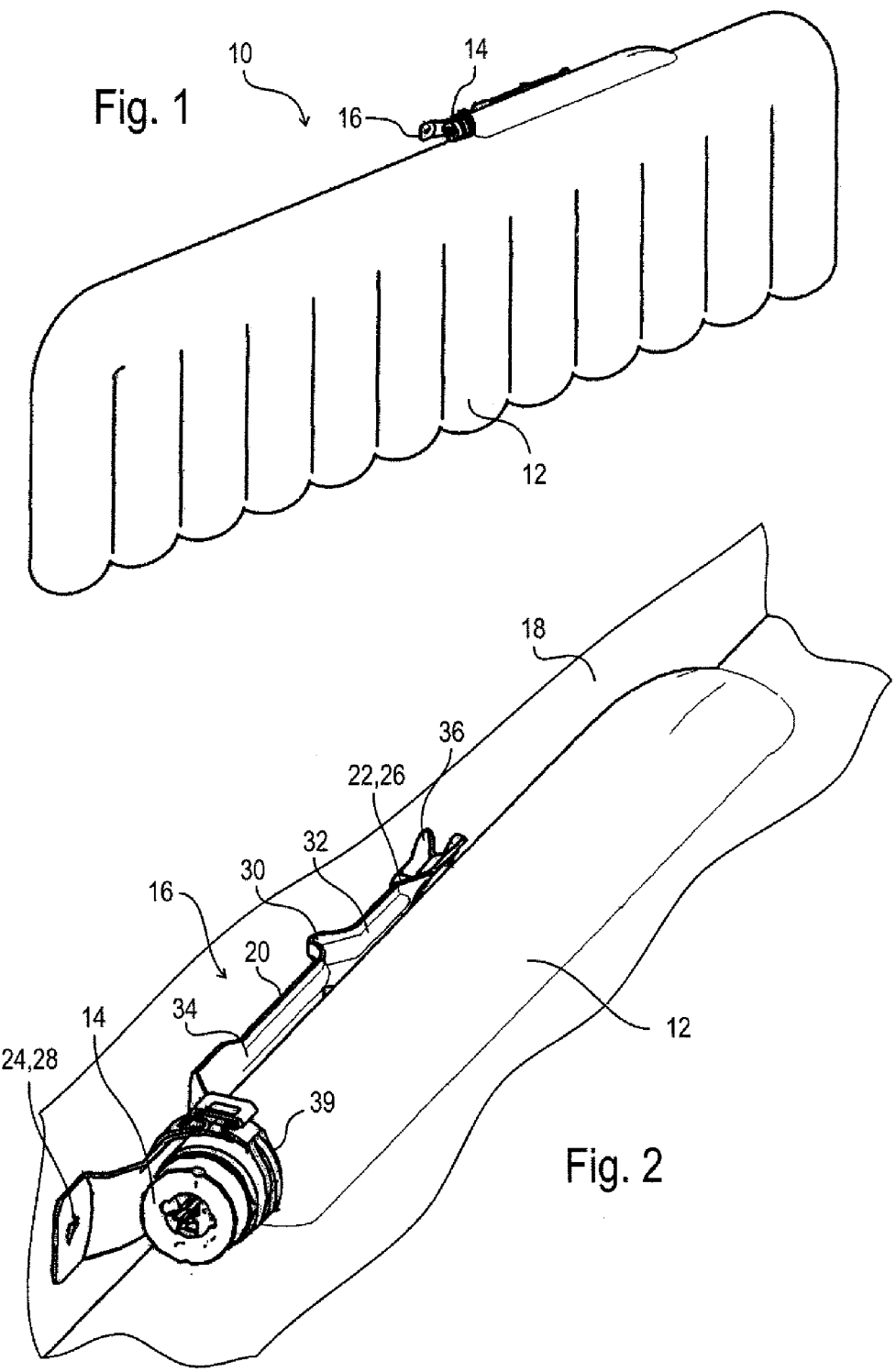

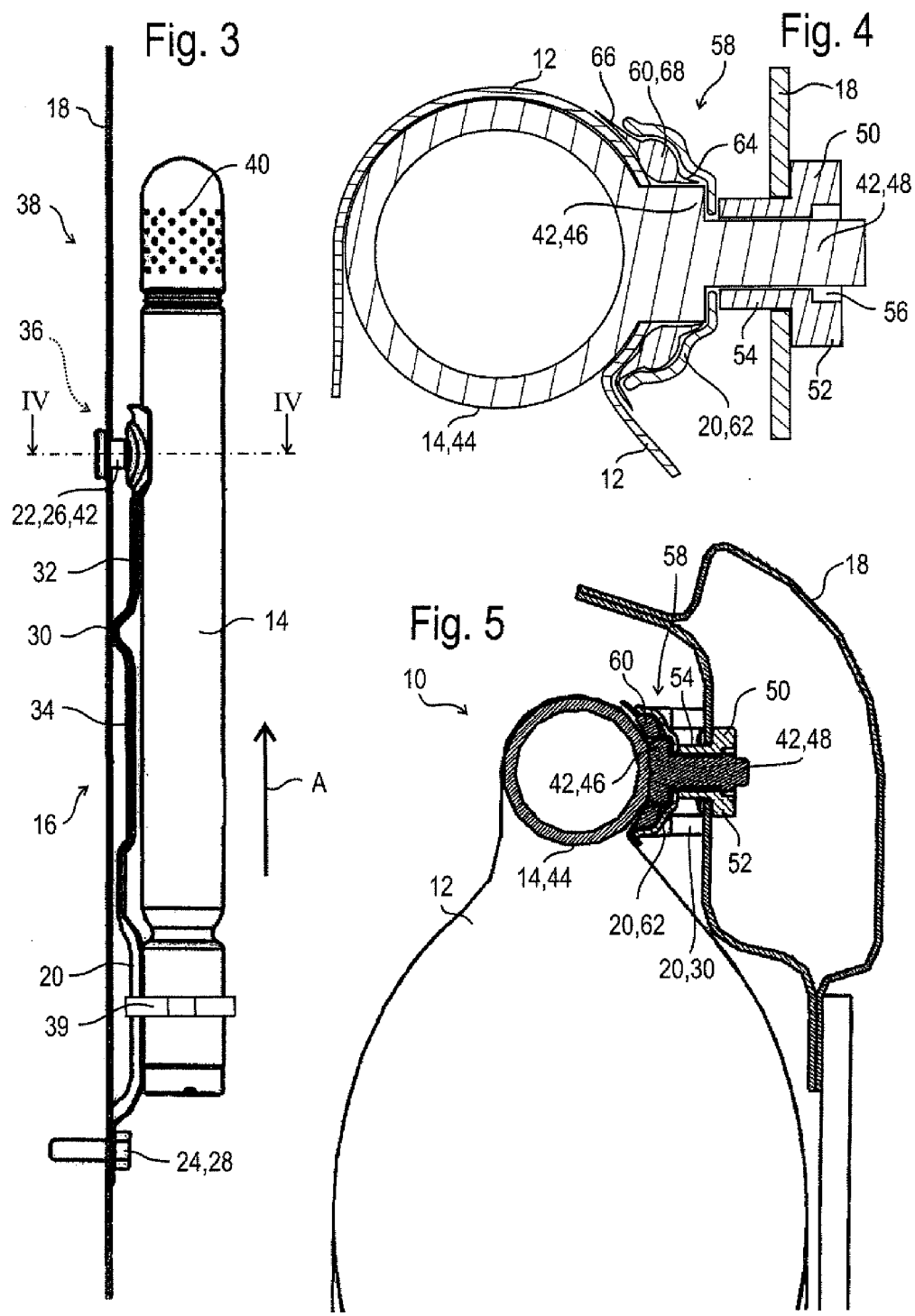

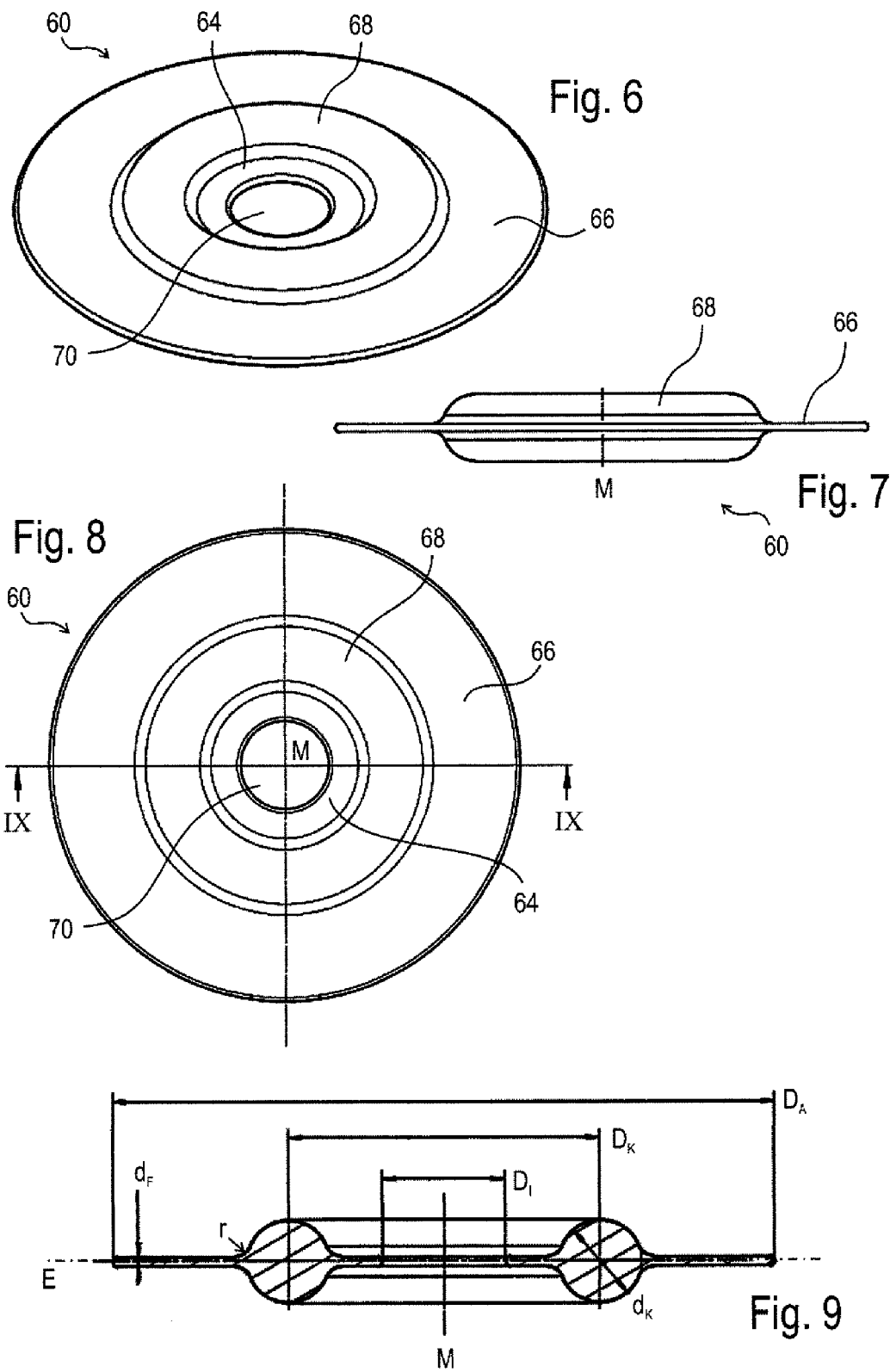

VEHICLE OCCUPANT RESTRAINT SYSTEM FOR A VEHICLE SEALING ELEMENT

FIELD OF THE INVENTION

The invention relates to a vehicle occupant restraint system for a vehicle comprising an inflator and an airbag connected to the inflator as well as to a sealing element, in particular for such vehicle occupant restraint system.

BACKGROUND OF THE INVENTION

From the state of the art vehicle occupant restraint systems comprising airbags are known in which the airbag is mounted directly on the inflator. The inflator in turn is locked at the vehicle.

It is an object of the invention to provide a vehicle occupant restraint system which requires little space and enables the airbag to be advantageously mounted on the inflator and the inflator to be mounted on the vehicle.

SUMMARY OF THE INVENTION

In accordance with the invention, this object is achieved by a vehicle occupant restraint system for a vehicle comprising an inflator and an airbag connected to the inflator, the inflator having a mounting extension that is provided for mounting the inflator on a vehicle part and protrudes through an orifice in the airbag. A sealing assembly arranged at the mounting extension clamps the airbag against the inflator and seals the orifice in the airbag. Such vehicle occupant restraint system permits simple mounting of the inflator on the vehicle as well as simultaneous mounting of the airbag on the inflator. Another advantage resides in the sealing of the orifice of the airbag, whereby gas losses at the mounting extension of the inflator are avoided when the vehicle occupant restraint system is actuated.

Preferably the sealing assembly comprises a sealing element and a flange part, wherein the sealing element is arranged between the inflator and the flange component.

The mounting extension may have a mounting base, the flange part being directly adjacent to the mounting base. This allows a fixed and defined positioning of the flange part at the inflator.

A mounting assembly for mounting the vehicle occupant restraint system on a vehicle part forces the flange part against the sealing element and ensures a compact design of the sealing assembly and of the mounting assembly as well as a reduction of the parts of the vehicle occupant restraint system.

It is possible that the flange part is adapted at least in portions to the outer contour of the inflator, preferably extends in groove shape, so as to partly surround the toroidal outer wall of the inflator. Thus good clamping and sealing is ensured even in irregularly shaped outer walls of the inflator.

In order to prevent, upon actuation of the vehicle occupant restraint system, the gas escaping from the inflator from contacting the sealing element, the airbag is preferably clamped between the sealing element and the inflator.

Easy and reliable positioning of the sealing element at the mounting extension can be obtained by the sealing element being adjacent to the mounting extension of the inflator at least by an integrally formed centering extension.

It is further possible that the sealing element has an extension projecting laterally outwardly which at least partly protrudes beyond the flange part. Such extension improves, on the one hand, the sealing function of the sealing element and permits, on the other hand, a simple visual check whether the sealing element is properly inserted and positioned.

For example, the mounting extension of the inflator can be a stud bolt and the sealing assembly can be urged toward the outer wall of the inflator by a nut screwed onto the stud bolt. In this way the force by which the sealing assembly clamps the airbag against the inflator can be increased and the sealing function is improved.

The invention further relates to a sealing element, in particular for an afore-described vehicle occupant restraint system including a closed annular sealing body having at least one lateral extension that extends in the central plane of the sealing body. With a sealing element of this type the sealing body fulfills the substantial sealing function, while the lateral extension can fulfill a number of additional functions but does not affect the sealing function of the sealing body.

The extension stretches, for instance, in the direction of the center of the sealing body and is preferably in the form of a centering extension. This permits a reliable and exact positioning of the sealing body relative to a part to be sealed in that the centering extension is adjacent to the mounting extension.

It is further possible that the extension stretches radially outwardly related to the center of the sealing body. The diameter of the sealing body is, for instance, a multiple of, preferably more than four times the thickness of the at least one extension.

In order to allow the sealing element to adapt to irregularly shaped components to be sealed, the sealing element is preferably formed of a flexible elastic material.

The at least one extension can be in the form of a closed circumferential lug in the form of an annular disk. In this way the extension permits to improve the sealing function of the sealing element.

The sealing body can have a circular toroidal cross-section which, viewed in cross-section, is transformed via a radius into the extension so that the extension is transformed into the toroid without a step.

BRIEF DESCRIPTION OF THE DRAWINGS

FIG. 1 shows a vehicle occupant restraint system according to the invention for a vehicle;

FIG. 2 shows a detailed view of the vehicle occupant restraint system according to FIG. 1;

FIG. 3 shows the inflator of the vehicle occupant restraint system according to FIG. 1 including a mounting device;

FIG. 4 shows a sectional view along the sectional plane IV-IV in FIG. 3 of the mounting device and of the sealing assembly of the vehicle occupant restraint system according to FIG. 2;

FIG. 5 shows a sectional view along the sectional plane IV-IV in FIG. 3 of the vehicle occupant restraint system according to FIG. 1;

FIG. 6 is a perspective view of a sealing element according to the invention;

FIG. 7 is a side top view of the sealing element according to FIG. 6;

FIG. 8 is a top view in axial direction of the sealing element according to FIG. 6; and FIG. 9 is a sectional view across the sealing element along the sectional plane IX-IX in FIG. 8.

DESCRIPTION OF THE EXAMPLE EMBODIMENT

FIG. 1 illustrates a vehicle occupant restraint system 10 comprising an airbag 12, in this case a head side airbag fastened to the roof frame, and an inflator 14. The inflator 14 is mounted on a vehicle part 18, the roof frame, by a mounting device 16. Although in the shown embodiment the vehicle occupant restraint system 10 is in the form of a head side airbag, also other designs of the vehicle occupant restraint system can be provided, however.

The mounting device 16 shown in FIG. 2 and FIG. 3 has an oblong support member 20 which includes a first mounting element 22 and a second mounting element 24 offset in an axial direction A for mounting on the vehicle part 18.

In the shown embodiment the first mounting element 22 is in the form of a hook 26 and the second mounting element 24 is in the form of a screwed connection 28.

The support member 20 includes a lever support 30 adjacent to the vehicle part 18 which in a first lever arm 32 shares the support member 20 with the first mounting element 22 and in a second lever arm 34 shares the support member 20 with the second mounting element 24.

The lever support 30 is sort of a rocker bearing by which the support member is adjacent especially loosely to the vehicle part 18.

In the shown embodiment the support member 20 is made of a reformed sheet metal in which the lever support 30 is constituted by an extension produced by reforming.

The hook 26 is positively connected to the vehicle part 18 in a keyhole-type opening 36.

FIG. 3 illustrates the inflator without the airbag. The inflator 14 and the mounting device 16 jointly form a mounting assembly 38 of the vehicle occupant restraint system.

The inflator 14 is tube-shaped and is connected at one end, in the area of the electric connection, to the support member 20 via a clip 39.

The clip 39 also serves for fastening the airbag 12 on the inflator 14, the airbag 12 being clamped between the clip 39 and the inflator 14.

At the other end of the inflator 14, in the area of the discharge orifices 40, the inflator 14 is connected to the support member 20 and the vehicle part 18 via a mounting extension 42 which is part of the first mounting element 22.

As is clearly visible from FIG. 3, the support member 20 contacts the vehicle part 18 by means of three points, wherein the first mounting element 22, the second mounting element 24 and the lever support 30 are connected to the vehicle part 18.

The first mounting element 22 in the form of a hook 26 is biased via the lever support 30 whereby the hook 26 is fixedly adjacent to the vehicle part 18. This bias is generated via the second mounting element 24, as with respect to FIG. 3 the associated screw urges the associated lever arm clockwise by virtue of the rocker bearing constituting the lever support 30. Thus force is applied equally clockwise to the lever which urges to the right. In the shown embodiment the support member 20 is formed to be partly elastic and is bent in a slightly elastic manner. When fixing the second mounting element, i.e. when bolting the screwed connection 28, the support member 20 is thus biased and forces the hook 26 against the vehicle part 18 via the lever support 30.

Alternatively, the support member 20 can be substantially rigid and the first and second mounting members 22, 24 can be mutually biased via the lever support 30.

FIG. 4 shows a first section across the vehicle occupant restraint system 10 in the area of the first mounting element 22.

At the housing 44 of the inflator 14 a mounting extension 42 including a mounting base 46 and a stud bolt 48 is provided. The mounting extension 42 protrudes through an orifice in the airbag 12.

A nut 50 forming the hook 26 of the first mounting element 22 is screwed onto the stud bolt 48.

The hook 26 has a wide head portion 52 and a tapered neck portion 54. The head portion 52 is dimensioned so that the maximum outer radius of the head portion 52 is smaller than or equal to the radius of the wide opening area of the keyhole-type orifice 36 in the vehicle part 18 and larger than or equal to the radius of the tapered opening area of the keyhole-type orifice 36. The neck portion 54 is dimensioned so that the radius of the neck portion 54 is smaller than or equal to the radius of the tapered opening area of the keyhole-type orifice 36. In this manner, the head portion 52 of the hook 26 can be inserted in the wide opening area and subsequently the neck portion 54 of the hook 26 can be pushed into the tapered opening area so that a positive connection is made.

In the shown embodiment the head and neck portions 52, 54 of the hook 26 are formed by a T-shaped nut 50.

It is also possible to form the hook 26 by the fact that the stud bolt 48 constitutes the tapered neck portion 54 of the hook 26 and the screwed-on nut 50 merely constitutes the head portion 52.

The nut 50 includes an internal toothing 56 for the rotational drive thereof. The internal toothing 56 is thus independent of the design of the radially outer surface of the head portion 52.

The stud bolt 48 of the mounting extension also protrudes through an opening in the support member 20. The support member 20 is directly adjacent to the mounting base 46 of the mounting extension 42 and is forced against the mounting base 46 by the neck portion 54 of the T-shaped nut 50. Thus the support member 20 is fixedly connected directly to the inflator 14.

Upon igniting the inflator 14 in the case of release of the vehicle occupant restraint system 10, great forces occur in the area of the gas discharge orifices 40 and thus in the area of the first mounting element 22.

The first mounting element 22 transmits the force via the mounting extension 42 of the inflator 14 substantially directly to the vehicle part 18. The support member 20 is loaded only slightly in the area of the first mounting element 22 and is manufactured in light-weight design.

The mounting assembly 38 comprises a sealing assembly 58 including a sealing element 60 and a flange part 62. The sealing assembly 58 serves for clamping the airbag 12 against the inflator 14 and for sealing the orifice of the airbag 12 at the mounting extension 42.

The flange part 62 is formed by the support member 20 and extends groove-shaped in the area of the mounting extension 42 so as to partly surround the toroidal outer wall of the inflator.

The sealing element 60 is forced in the direction of the outer wall of the inflator by the flange part 62, wherein the sealing element 60 clamps the airbag 12 against the inflator 14 and seals the orifice in the airbag 12.

The sealing element 60 has an integrally formed centering extension 64 by which it is adjacent to the mounting extension 42 of the inflator. The centering extension 64 ensures a correct positioning of the sealing element 60 when mounting the vehicle occupant restraint system 10.

The sealing element 60 further includes an extension 66 projecting laterally radially outwardly which projects beyond the flange part 62. The extension 66, on the one hand, improves the sealing and clamping function of the sealing element 60 and, on the other hand, permits a simple check as to whether the sealing element 60 is provided and is correctly positioned.

FIG. 5 illustrates another sectional view of the vehicle occupant restraint system 10. The mounting extension 42 is welded to the inflator 14 in this embodiment.

The vehicle part 18 is a hollow component in this embodiment. In this embodiment the mounting extension 42 including the screwed-on nut 50 is inserted in the wide opening area of the keyhole-type orifice 36. Subsequently the mounting assembly 38 including the inflator 14 and the mounting device 16 is shifted in the axial direction, wherein the hook 26 is pushed with the neck portion 54 into the tapered opening area of the keyhole-type orifice 36, thereby a positive connection being brought about.

The mounting device is locked in axial direction at this position via the second mounting element 24 in the form of a screwed connection 28, and the hook 26 is biased via the lever support 30 and with the head portion 52 is adjacent to the wall of the vehicle part 18.

Hereinafter the sealing element 60 is described in detail by way of the FIGS. 6 to 9. FIG. 6 illustrates a perspective view of the sealing element 60. The sealing element 60 comprises a closed annular sealing body 68 having an annular diameter $D_K$ and two lateral extensions 64, 66 extending in the central plane E of the sealing body 68. A circular recess 70 is provided in the center of the sealing element 60.

The sealing body 68 is preferably formed by a torpid circular in cross-section, the diameter $d_K$ relating to the center of the cross-section.

The first extension 64 extends toward the center M of the sealing body 68 and is in the form of a centering extension.

The second extension 66 extends radially outwardly, related to the center M of the sealing body 68.

FIG. 7 illustrates a lateral top view and FIG. 8 illustrates a top view in axial direction onto the sealing element 60. Each of the two extensions 64, 66 is a closed circumferential lug in annular disc shape.

Alternatively it is possible that the extensions are formed in the circumferential direction in segments only.

The sealing element 60 is made of a flexible elastic material. In this manner, the sealing element 60 can adapt to the geometry of the components to be sealed, for instance to a groove or saddle shape.

FIG. 9 illustrates a sectional view of the sealing element 60. The outer diameter $D_A$ is defined by the outer extension 66 and the inner diameter $D_I$ is defined by the inner extension 64.

The sealing body 68 has a circular toroidal cross-section which is transformed, viewed in cross-section, via a radius r into the extension 64, 66.

Each of the extensions 64, 66 has a uniform axial thickness $d_F$ which is at most 25% of the axial thickness $D_K$ of the sealing body 68. The small axial thickness increases the flexibility of the sealing element 60 in the area of the extensions 64, 66.

The invention claimed is:

1. A vehicle occupant restraint system (10) for a vehicle comprising
    an inflator (14) and an airbag (12) connected to the inflator (14),
    wherein the inflator (14) has a mounting extension (42) which is provided for mounting the inflator (14) on a vehicle part (18) and protrudes through an orifice in the airbag (12) and a sealing assembly (58) arranged at the mounting extension (42) is provided which clamps the airbag (12) against the inflator (14) and seals the orifice in the airbag (12), the sealing assembly (58) comprising a sealing element (60) and a flange part (62) that compresses the sealing element (60) so that the sealing element (60) conforms to the shape of a space between the flange part (62) and the airbag (12).

2. The vehicle occupant restraint system (10) according to claim 1, wherein a mounting assembly (38) is provided for mounting the vehicle occupant restraint system (10) on a vehicle part (18).

3. The vehicle occupant restraint system (10) according to claim 1, wherein a mounting extension (42) has a mounting base (46), wherein a flange part (62) is directly adjacent to the mounting base (46).

4. The vehicle occupant restraint system (10) according to claim 1, wherein the sealing element (60) is arranged between the inflator (14) and the flange part (62).

5. The vehicle occupant restraint system (10) according to claim 4, wherein the flange part (62) is adapted at least in portions to the outer contour of the inflator (14), and extends groove-shaped so as to partly surround the toroidal outer wall of the inflator (14).

6. The vehicle occupant restraint system (10) according to claim 4, wherein the airbag (12) is clamped between the sealing element (60) and the inflator (14).

7. The vehicle occupant restraint system (10) according to claim 4, wherein the sealing element (60) is adjacent to the mounting extension (42) of the inflator (14) at least by an integrally formed centering extension (64).

8. The vehicle occupant restraint system (10) according to claim 4, wherein the sealing element (60) has an extension (66) protruding laterally radially outwardly which protrudes laterally at least partly beyond the flange part (62).

9. The vehicle occupant restraint system (10) according to claim 1, wherein the mounting extension (42) of the inflator (14) is a stud bolt (48) and the sealing assembly (58) is forced in the direction against the outer wall of the inflator (14) by a nut (50) screwed onto the stud bolt (48).

10. A sealing element (60), in particular for a vehicle occupant restraint system (10) according to claim 1, comprising a closed annular sealing body (68) having at least one lateral extension (64, 66) extending in the central plane (E) of the sealing body (68).

11. The sealing element (60) according to claim 10, wherein the extension (64) extends in the direction of the center (M) of the sealing body (68) and is in the form of a centering extension.

12. The sealing element (60) according to claim 10, wherein the extension (66) extends radially outwardly related to the center (M) of the sealing body (68).

13. The sealing element (60) according to claim 10, wherein a diameter ($d_K$) of the sealing body (68) is a multiple of a thickness ($d_F$) of the at least one extension (64, 66).

14. The sealing element (60) according to claim 13, wherein the thickness ($d_F$) of the at least one extension (64, 66) is no more than 25% of the diameter ($d_K$) of the sealing body (68).

15. The sealing element (60) according to claim 10, wherein the sealing element (60) is made of a flexible elastic material.

16. The sealing element (60) according to claim 10, wherein the at least one extension (64, 66) is a closed circumferential lug in annular disc shape.

17. The sealing element (60) according to claim 10, wherein the sealing body (68) has a circular toroidal cross-section which is transformed, viewed in cross-section, via a radius (r) into the extension (64, 66).

* * * * *